(12) United States Patent
Joshi et al.

(10) Patent No.: US 12,703,230 B2
(45) Date of Patent: Aug. 11, 2026

(54) AUTOMOTIVE SCREEN DEPLOYMENT SYSTEM

(71) Applicant: TOYOTA MOTOR ENGINEERING & MANUFACTURING NORTH AMERICA, INC., Plano, TX (US)

(72) Inventors: Shailesh N. Joshi, Ann Arbor, MI (US); Ercan Mehmet Dede, Ann Arbor, MI (US); Frederico Marcolino Quintao Severgnini, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 400 days.

(21) Appl. No.: 18/467,668

(22) Filed: Sep. 14, 2023

(65) Prior Publication Data

US 2025/0091415 A1 Mar. 20, 2025

(51) Int. Cl.
*B60J 3/02* (2006.01)
*F03G 7/00* (2006.01)

(52) U.S. Cl.
CPC ............ *B60J 3/0278* (2013.01); *F03G 7/016* (2021.08)

(58) Field of Classification Search
CPC ................................ B60J 3/0278; F03G 7/016
USPC .............. 296/97.4, 97.8, 97.5; 348/118, 148; 359/291
See application file for complete search history.

(56) References Cited

U.S. PATENT DOCUMENTS 6,811,201 B2 11/2004 Naik
7,984,746 B2 * 7/2011 Gao ....................... B60J 1/2011 160/370.21
8,109,318 B2 * 2/2012 Browne ................. B60J 11/025 160/1
8,162,376 B1 4/2012 Grossmith
8,656,714 B2 * 2/2014 Pinto, IV ............. F03G 7/0612 60/527
9,272,426 B2 * 3/2016 Morris ...................... F03G 7/00
9,463,739 B2 10/2016 Salter et al.
(Continued)

FOREIGN PATENT DOCUMENTS

WO 2004060704 A2 7/2004
WO 2006016907 A2 2/2006

OTHER PUBLICATIONS

"Light-Driven Expansion of Spiropyran Hydrogels" Apr. 2020 (Apr. 24, 2020) [online] (retrieved from internet on Dec. 16, 2025) https://pubs.acs.org/doi/full/10.1021/jacs.0c02201 (Year: 2020).*
(Continued)

*Primary Examiner* — Joseph D. Pape
(74) *Attorney, Agent, or Firm* — HAYNES AND BOONE, LLP

(57) ABSTRACT

A screen deployment device includes a screen, a light source, and a photoactuator coupled to the screen and configured to change size or shape in response to light. When the photoactuator is illuminated by light from the light source, the screen is in a first shape, position, or orientation (e.g., unfolded, unrolled, or otherwise deployed), and when the photoactuator is not illuminated by light from the light source, the screen is in a second shape, position, or orientation (e.g., folded, rolled, or otherwise stowed).

18 Claims, 8 Drawing Sheets

(56) References Cited

U.S. PATENT DOCUMENTS

| | | | |
|---|---|---|---|
| 10,737,614 | B2 | 8/2020 | Holland et al. |
| 10,906,381 | B1 | 2/2021 | Muhammad |
| 11,143,169 | B2 | 10/2021 | Li et al. |
| 11,279,783 | B2 | 3/2022 | Ziolkowski et al. |
| 11,285,872 | B2 | 3/2022 | Pan |
| 2003/0156991 | A1 | 8/2003 | Halas et al. |
| 2008/0094529 | A1 | 4/2008 | He et al. |
| 2019/0092170 | A1* | 3/2019 | Gassman ............ B60R 11/0229 |
| 2022/0289002 | A1 | 9/2022 | Keen |
| 2022/0298169 | A1 | 9/2022 | Li et al. |

OTHER PUBLICATIONS

Ganguly, Saptam et al., "Enhanced photostrictive actuation in freestanding ferroelectric membranes", May 2023.

Li, Jingjing et al., "Recent advances in photoactuators and their applications in intelligent bionic movements", Advanced Optical Materials, 16 pages, 2020.

Zhang, Xiaobo et al., "Photoactuators and motors based on carbon nanotubes with selective chirality distributions", Nature Communications, 8 pages, Jan. 2014.

Herath, Madhubhashitha et al., "Light activated shape memory polymers and composites: A review", European Polymer Journal, Aug. 2020.

Jamal, Mustapha et al., "Directed growth of fibroblasts into three dimensional micropatterned geometries via self-asembling scaffolds", Biomaterials, Mar. 2010, 31(7):1683-90. doi: 10.1016/j.biomaterials.2009.11.056. PMID: 20022106; PMCID: PMC2813973.

* cited by examiner

AUTOMOTIVE SCREEN DEPLOYMENT SYSTEM

TECHNICAL FIELD

The subject matter described herein relates to devices, systems, and methods for actuating a screen in a vehicle interior. This technology has particular but not exclusive utility for consumer and commercial cars and trucks.

BACKGROUND

A screen can be defined as a blocker, separator, or display. For example, a vehicle interior may include sun visors (whether opaque or translucent), window shades (whether for privacy or to block sunlight), interior curtains (whether decorated or plain), insect-blocking meshes, air vent closures, and video displays. Each of these can be considered a screen, and other types of screens may exist in the vehicle interior as well. Some screens are fixed in place, while other screens are deployable, either manually or by means of motor-driven actuators. However, manual operation may not always be feasible (e.g., if a screen is not within reach of the driver), whereas motor-driven actuators may require significant power to operate, are subject to electrical or mechanical breakdown, and may not function when the vehicle is powered off.

It is therefore to be appreciated that such commonly used screens have numerous drawbacks, including power consumption, a need for user intervention, and otherwise. Accordingly, long-felt needs exist for improved screens and screen deployment mechanisms that address the forgoing and other concerns.

The information included in this Background section of the specification, including any references cited herein and any description or discussion thereof, is included for technical reference purposes only and is not to be regarded as limiting.

SUMMARY

The present disclosure provides a system to actuate (e.g., extend or retract) screens using light-emitting diodes (LEDs) and a photoactive material that changes size or shape in response to the LED light. The screen deployment system provides an improvement over the current technology by eliminating motor actuators. The screen deployment system disclosed herein has particular, but not exclusive, utility for operating shades, visors, and display screens in a vehicle interior.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a screen deployment device. The screen deployment device includes a screen, a light source, and a photoactuator coupled to the screen and configured to change size or shape in response to light. When the photoactuator is illuminated by light from the light source, the screen is in a first shape, position, or orientation. When the photoactuator is not illuminated by light from the light source, the screen is in a second shape, position, or orientation. Other embodiments of this aspect include corresponding computer systems, apparatus, and computer programs recorded on one or more computer storage devices, each configured to perform the actions of the methods.

Implementations may include one or more of the following features. In some embodiments, the light source may include an LED. In some embodiments, the light source may include sunlight. In some embodiments, the light source may include an incandescent light bulb, electroluminescent panel, cathode ray tube, or video display. In some embodiments, the photoactuator may include a photoactive material. In some embodiments, the photoactive material may include a spiropyran hydrogel. In some embodiments, the screen may be a sun visor. In some embodiments, the screen may be a video display. In some embodiments, the first shape, position, or orientation is associated with the screen not performing a function, and the second shape, position, or orientation is associated with the screen performing the function. In some embodiments, the function is displaying video or blocking sunlight. Implementations of the described techniques may include hardware, a method or process, or computer software on a computer-accessible medium.

One general aspect includes a screen deployment system. The screen deployment system includes a vehicle; a screen disposed within the vehicle; a light source; and a photoactuator disposed within the vehicle and coupled to the screen and configured to change size or shape in response to light. When the photoactuator is illuminated by light from the light source, the screen is in a first shape, position, or orientation. When the photoactuator is not illuminated by light from the light source, the screen is in a second shape, position, or orientation. Other embodiments of this aspect include corresponding computer systems, apparatus, and computer programs recorded on one or more computer storage devices, each configured to perform the actions of the methods.

Implementations may include one or more of the following features. In some embodiments, the light source may include an LED. In some embodiments, the light source may include sunlight. In some embodiments, the light source may include an incandescent light bulb, electroluminescent panel, cathode ray tube, or video display. In some embodiments, the photoactuator may include a photoactive material. In some embodiments, the screen is a sun visor, where the first shape, position, or orientation is associated with the sun visor not blocking sunlight, and where the second shape, position, or orientation is associated with the sun visor blocking sunlight. In some embodiments, the screen is a video display, where the first shape, position, or orientation is associated with the video display not displaying video, and where the second shape, position, or orientation is associated with the video display displaying video. Implementations of the described techniques may include hardware, a method or process, or computer software on a computer-accessible medium.

One general aspect includes a method for deploying a screen. The method includes coupling the screen to a photoactuator, where the photoactuator is configured to change size or shape in response to light. The method also includes illuminating the photoactuator with light from a light source, such that: when the photoactuator is illuminated by the light from the light source, the screen is in a first shape, position, or orientation, and when the photoactuator is not illuminated by the light from the light source, the screen is in a second shape, position, or orientation. Other embodiments of this aspect include corresponding computer systems, apparatus, and computer programs recorded on one or more computer storage devices, each configured to perform the actions of the methods.

Implementations may include one or more of the following features. In some embodiments, the light source is an LED, the photoactuator may include a photoactive material, and the screen is a sun visor or video display. In some embodiments, the first shape, position, or orientation is associated with the screen not performing a function, and the second shape, position, or orientation is associated with the screen performing the function. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the screen deployment system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
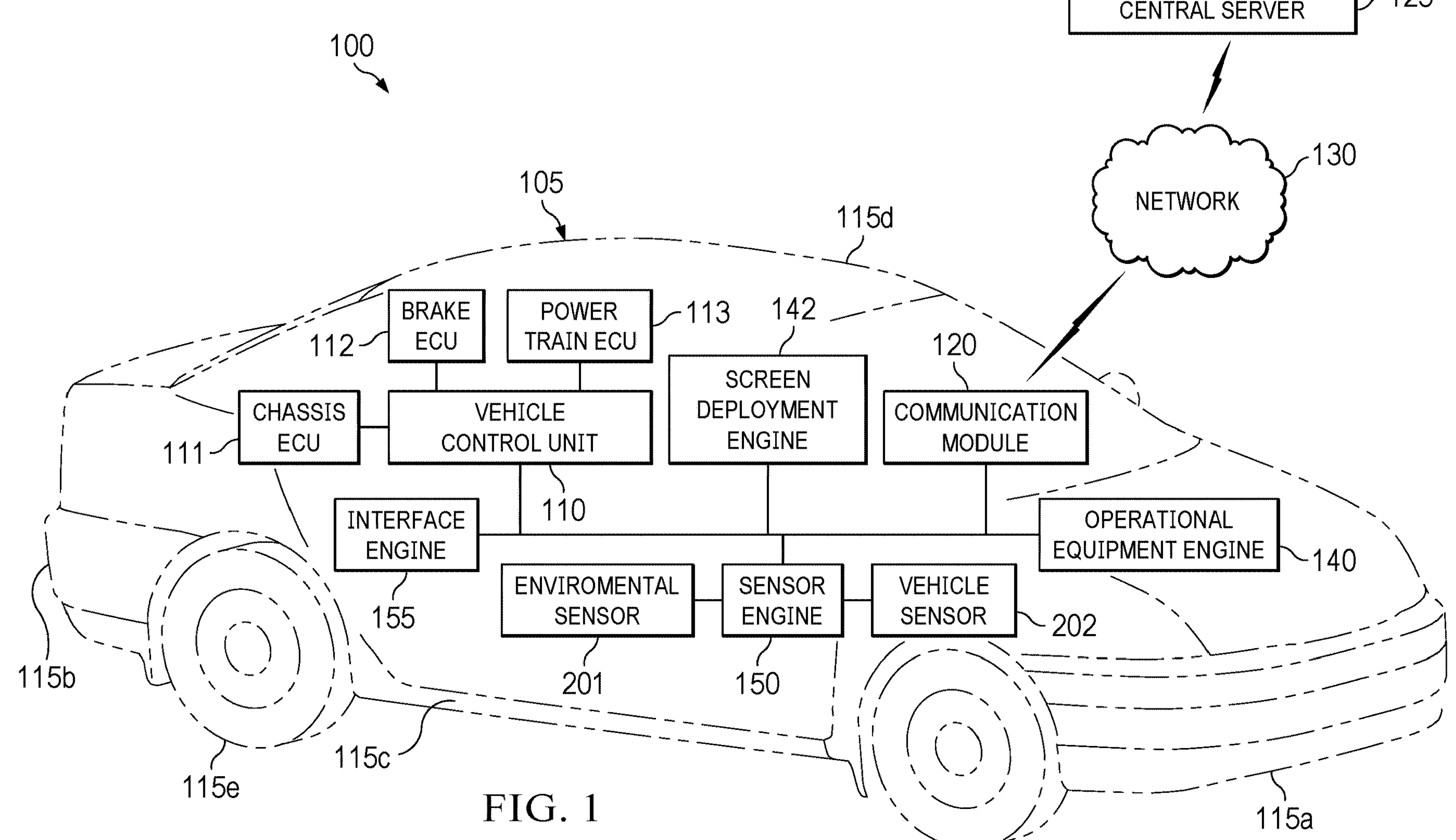
FIG. 1 is a diagrammatic illustration of a screen deployment system in accordance with at least one embodiment of the present disclosure.

In accordance with at least one embodiment of the present disclosure, a screen deployment system is provided that uses light to deploy (e.g., roll/unroll, fold/unfold, extend/retract, etc.) a screen (e.g., a video display, sun visor, privacy screen, etc.) in a vehicle interior. The light may for example be provided by one or more LEDs, which energize a photoactuator material. In some embodiments, the light may be or include sunlight, ambient light, vehicle interior light, light from oncoming headlamps, etc. The photoactuator material may for example be a liquid crystal elastomer or a spiropyran-based or spiropyran-doped liquid crystal polymer hydrogel, that changes size and/or shape when irradiated with light (e.g., visible light, near-infrared light, ultraviolet light, etc.). Other photoactuator materials can be used instead or in addition, without departing from the spirit of the present disclosure. Various photoactuation mechanisms, devices, systems, and methods are described below. However, it is understood that other mechanisms, devices, systems, and methods may be used instead or in addition, without departing from the spirit of the present disclosure.

The present disclosure aids substantially in the ability of a vehicle driver or passenger to deploy screens in the vehicle interior, by providing improved actuation mechanisms that do not require motor actuators and are therefore less subject to mechanical breakdown. Implemented on a screen in conjunction with a photoactuator material and a light source, the screen deployment system disclosed herein provides practical control (whether automatic or user-commanded) over screen deployment. This improved capability transforms manual or motor-driven screen actuation into photo-actuated deployment, without the normally routine need for human intervention and/or the large electrical currents required by electric motors. This unconventional approach improves the functioning of the vehicle, by reducing the amount of time, effort, and/or energy required to extend or retract a screen.

In some embodiments, the screen deployment system may be implemented at least partially through a process viewable on a screen display, and operated by a control process executing on a processor that accepts inputs from user controls and/or sensors in the vehicle interior or exterior. In that regard, the control process performs certain specific operations in response to different inputs or received at different times, either from one or more sensors, or from a vehicle operator. Certain structures, functions, and operations of the processor, display, sensors, and user input systems are known in the art, while others are recited herein to enable novel features or aspects of the present disclosure with particularity. Some actions of the screen deployment system (e.g., illuminating an LED) may be triggered or mediated by sensors, processors, user controls, etc., while other functions (e.g., expansion or contraction of a photoactuator material in response to changing illumination levels) may occur automatically.

These descriptions are provided for exemplary purposes only, and should not be considered to limit the scope of the screen deployment system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration of a screen deployment system in accordance with at least one embodiment of the present disclosure. In an example, a screen deployment system is referred to by the reference numeral 100 and includes a vehicle 105, such as an automobile, and a vehicle control unit 110 located on the vehicle 105. The vehicle 105 may include a front portion 115*a* (including a front bumper), a rear portion 115*b* (including a rear bumper), a right side portion 115*c* (including a right front quarter panel, a right front door, a right rear door, and a right rear quarter panel), a left side portion 115*d* (including a left front quarter panel, a left front door, a left rear door, and a left rear quarter panel), and wheels 115*e*. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the screen deployment system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a screen deployment engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
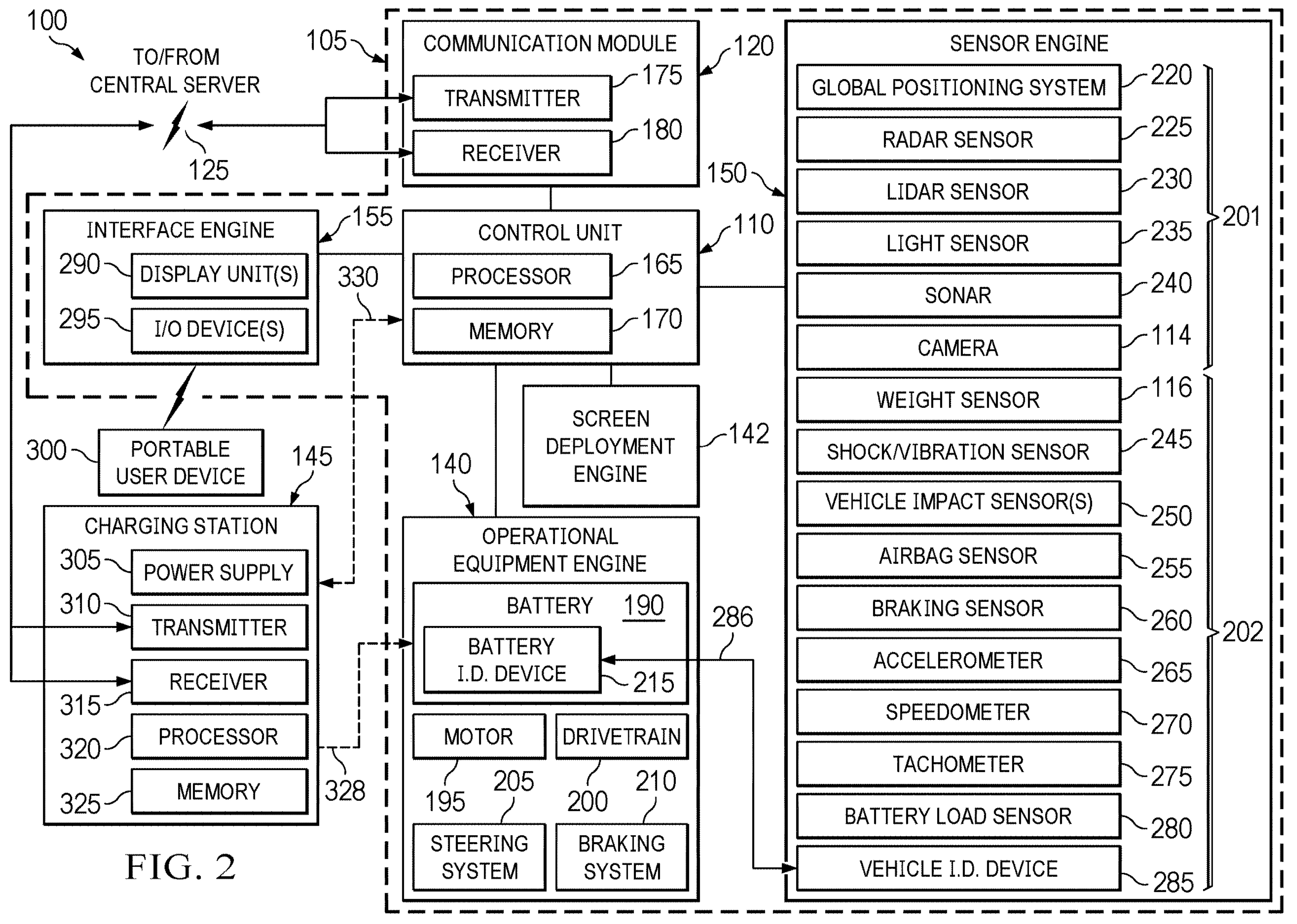
FIG. 2 is a diagrammatic illustration, in a block-diagram form, of at least a portion of the screen deployment system of FIG. 1, in accordance with at least one embodiment of the present disclosure.

FIG. 2 is a diagrammatic illustration, in a block-diagram form, of at least a portion of the screen deployment system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115*e* of the vehicle 105 via the drivetrain 200. In some examples, instead of or in addition to providing power to the motor 195 to drive the wheels 115*e* of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a radar sensor 225, a lidar sensor 230, a light sensor 235, a sonar sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a camera 114, a weight sensor 116, or any combinations thereof. The sensors or other detection devices may be configured to sense or detect activity, conditions, and circumstances in an area to which the device has access, e.g., conditions inside or outside the vehicle cabin. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 associated with an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The screen deployment system 100 also includes a screen deployment engine 142, the operation of which will be described below. In some embodiments, the screen deployment engine 142 comprises a standalone housing with its own processor and memory. In other embodiments, the screen deployment engine 142 exists as software, firmware, or hardware within another processor, such as the vehicle control unit 110, operational equipment engine 140, or power train ECU 113. The sensor engine 150 includes environmental sensors 201 and vehicle sensors 202. In an example, the screen deployment engine 142 receives sensor data from one or more sensors, which may for example be light sensor 235 or other sensors 201 in order to determine whether it may be desirable to extend or retract a screen.

A reader of ordinary skill in the art will understand that other components or arrangements of components may be found in a vehicle 105, and that the same general principles apply to electric vehicles, internal combustion vehicles, and hybrid vehicles.

Figure 3:
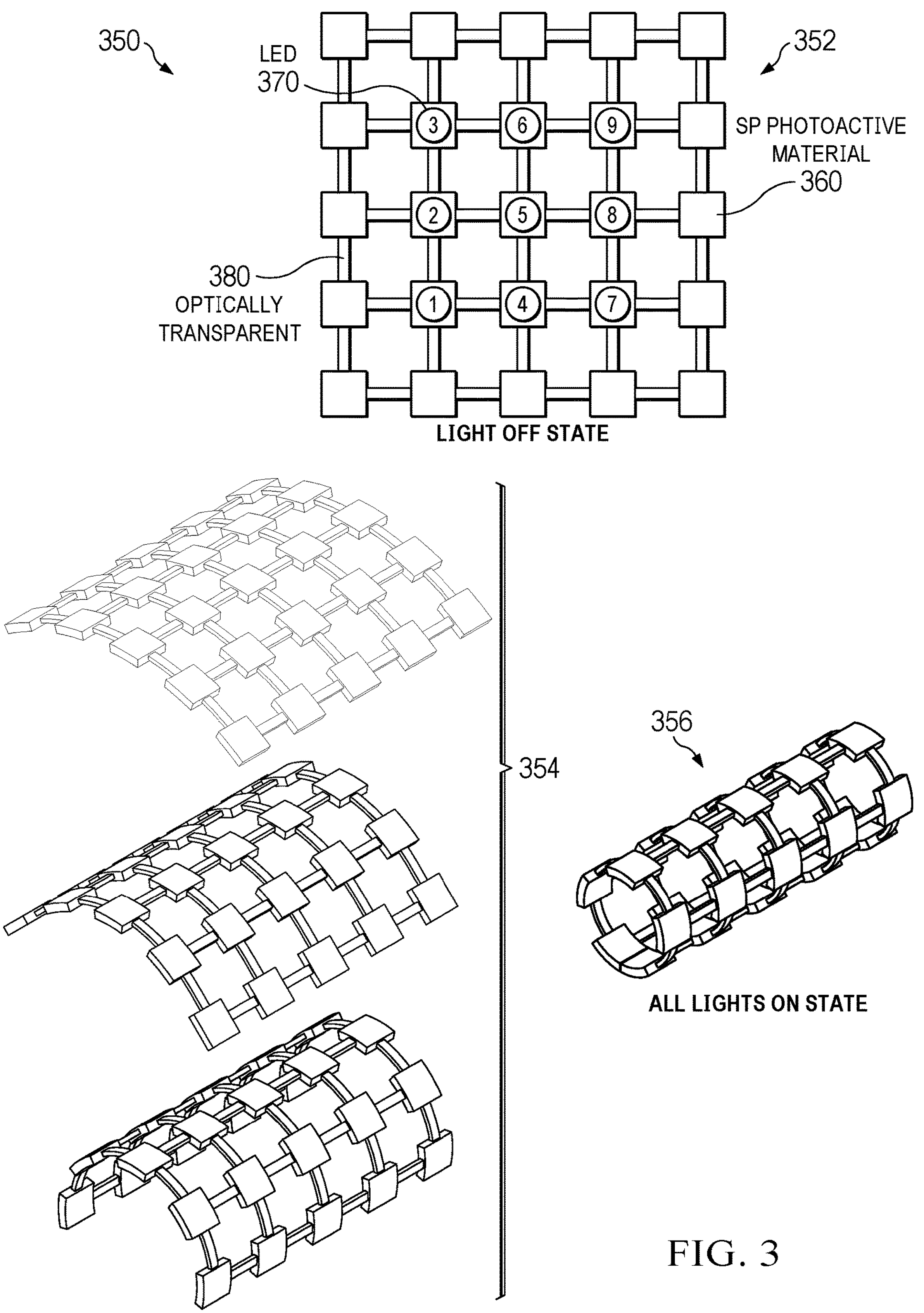
FIG. 3 is a visual representation of a photoactuation mechanism, in accordance with at least one embodiment of the present disclosure.

FIG. 3 is a visual representation of a photoactuation mechanism 350, in accordance with at least one embodiment of the present disclosure. The photoactuation mechanism 350 is shown in a flat state 352, a rolled (e.g., cylindrical) state 356, and three intermediate states 354. The photoactuation mechanism 350 includes a lattice of a substrate material 380 (e.g., an optically transparent material), whose interstices have been coated on one side with a photoactive material 360 that expands in response to light. The photoactuation mechanism 350 also includes a number of LEDs 370 that may be in contact with the photoactive material 360 and/or the substrate material 380, or may be physically separated from both materials and positioned such that activation of the LEDs (individually numbered 1-9) causes the photoactive material 360 to be illuminated. In the example shown in FIG. 3, activation of all of the LEDs thus causes the photoactuation mechanism 350 to transition from the flat configuration 352, through the intermediate configurations 354, to the rolled or cylindrical configuration 356.

Other actuation scenarios are possible, and fall explicitly within the scope of the present disclosure. For example, it is noted that if the photoactuation mechanism 350 is in the flat configuration 352 when the substrate material 380 is relaxed, and the photoactive material 360 is located on the same surface of the photoactuation mechanism 350 as the LEDs 370, then when the LEDs 370 emit light, expansion of the photoactive material 360 will cause the photoactuation mechanism 350 to curl into the rolled state 356 with the LEDs on the outside of the cylinder, and switching off the LEDs 370 will cause the photoactuation mechanism 350 to return to the flat configuration 352.

Similarly, if the photoactuation mechanism 350 is in the flat configuration 352 when relaxed, and the LEDs 370 are on the opposite surface of the photoactuation mechanism 350 from the photoactive material 360 (e.g., if the LEDs 370 are shining through the transparent material 380 to reach the photoactive material 360), then when the LEDs 370 emit light, expansion of the photoactive material will cause the photoactuation mechanism 350 to curl such that the LEDs are on the inside of the cylinder, and switching off the LEDs 370 will cause the photoactuation mechanism 350 to return to the flat configuration 352.

If the photoactuation mechanism 350 is in the curled configuration 352 when relaxed, and the photoactive material 360 is located on the inside surface of the cylinder, then expansion of the photoactive material 360 will cause the photoactuation mechanism 350 to uncurl into the flat configuration 352. A reader of ordinary skill in the art will therefore appreciate that, depending on the configuration of the LEDs 370, photoactive material 360, and transparent material 380, the photoactuation mechanism 350 can either curl or uncurl when the LEDs 370 emit light.

Furthermore, other types of photoactive materials may be used that, instead of expanding when illuminated, contract or otherwise change shape when illuminated. Other substrate shapes besides lattices may be used, including sheets, strips, gratings, spirals, and otherwise. Similarly, other photoactuation mechanism shapes besides planes and cylinders can also be used, (e.g., arcs, spheres, splines, saddles, corners, boxes, etc.) as would occur to a person of ordinary skill in the art. Furthermore, for configurations where the LEDs 370 and photoactive material 360 are located on the same surface (e.g., then the LEDs 370 are in contact with and shining directly into the photoactive material 360), there is no need for the substrate material 380 to be transparent. Rather, the substrate material can be translucent, opaque, reflective, etc.

Thus, a person of ordinary skill will appreciate that depending on the implementation, the substrate 380, photoactive material 360, and LEDs 370 can be configured such that the photoactuation mechanism 350 transitions, when illuminated, from a desired first shape and/or orientation to a desired second shape and/or orientation that is different from the first shape and/or orientation. Myriad combinations of these first shapes/orientations and second shapes/orientations can be used to actuate (e.g., roll/unroll, fold/unfold, bend/unbend, extend/retract, etc.) a screen in a desired direction. Such actuation may be binary (e.g., the photoactuation mechanism is either in the first shape/orientation or the second shape/orientation), or may include a number or continuum of intermediate states such that varying levels of illumination produce gradual changes in shape and/or orientation.

Figure 4:
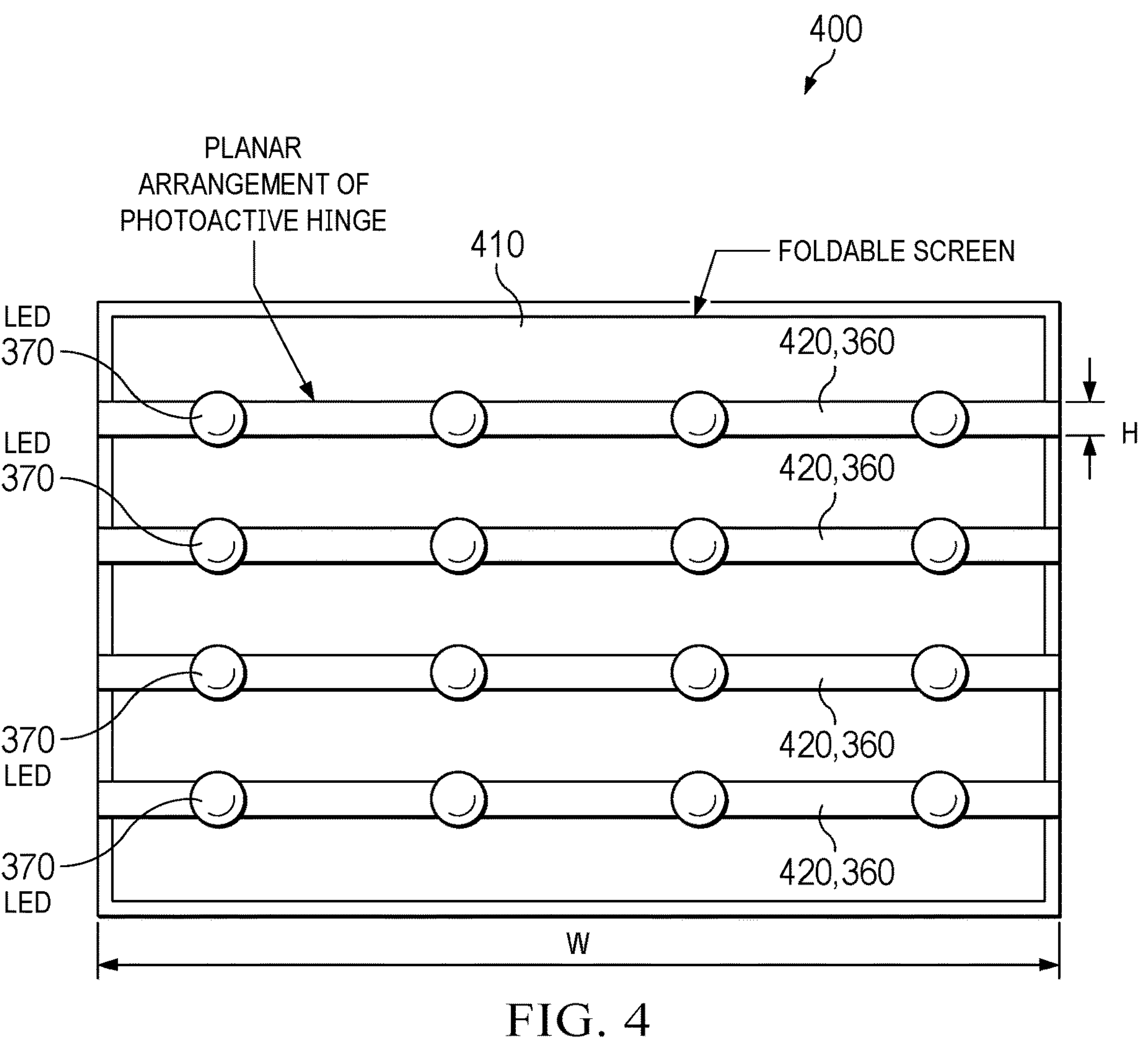
FIG. 4 is a diagrammatic illustration of a deployable screen of the screen deployment system, in accordance with at least one embodiment of the present disclosure.

FIG. 4 is a diagrammatic illustration of a screen deployment device or deployable screen 400 of the screen deployment system, in accordance with at least one embodiment of the present disclosure. The deployable screen 400 includes a screen 410. The screen 410 may for example be an opaque screen such as a sun visor or blackout curtain, a translucent screen such as a curtain or privacy screen, a transparent screen such as a window, or an illuminated screen such as an electroluminescent light or video display. The deployable screen 400 also includes stripes 420 of a photoactive material 360, as well as LEDs 370 configured to illuminate the photoactive material 360. Because the stripes 420 have a width W that is significantly greater than their height H, the expansion of the photoactive material 360 is significantly larger in the horizontal direction than in the vertical direction.

In one possible embodiment of FIG. 4, the screen 410 is configured to be in a rolled state when relaxed, and the photoactive material 360 is configured to expand when illuminated, such that the expansion unrolls the screen 410 into a flat, unrolled state. In an example, the screen may be in a rolled state when not in use, and may be unrolled so that it can be used (e.g., to block sunlight, provide privacy, display images, etc., depending on the screen type of the screen 410). In some instances, the roll-up process may be realized by actuating LEDs 370 row-by-row in the LED array, thus providing fine control over the degree and speed of rolling/unrolling.

In some embodiments, if the screen 410 is an illuminated screen, then light emitted by the illuminated screen may be used to illuminate the photoactive material 360 and thus actuate the deployable screen 400. Similarly, in some embodiments, ambient light (e.g., sunlight, diffuse light from the sky, vehicle interior lights, or light emitted by streetlights or other vehicles) may be used to illuminate the photoactive material 360 and thus actuate the deployable screen 400. Depending on the implementation, such embodiments may not require the LEDs 370.

Figure 5:
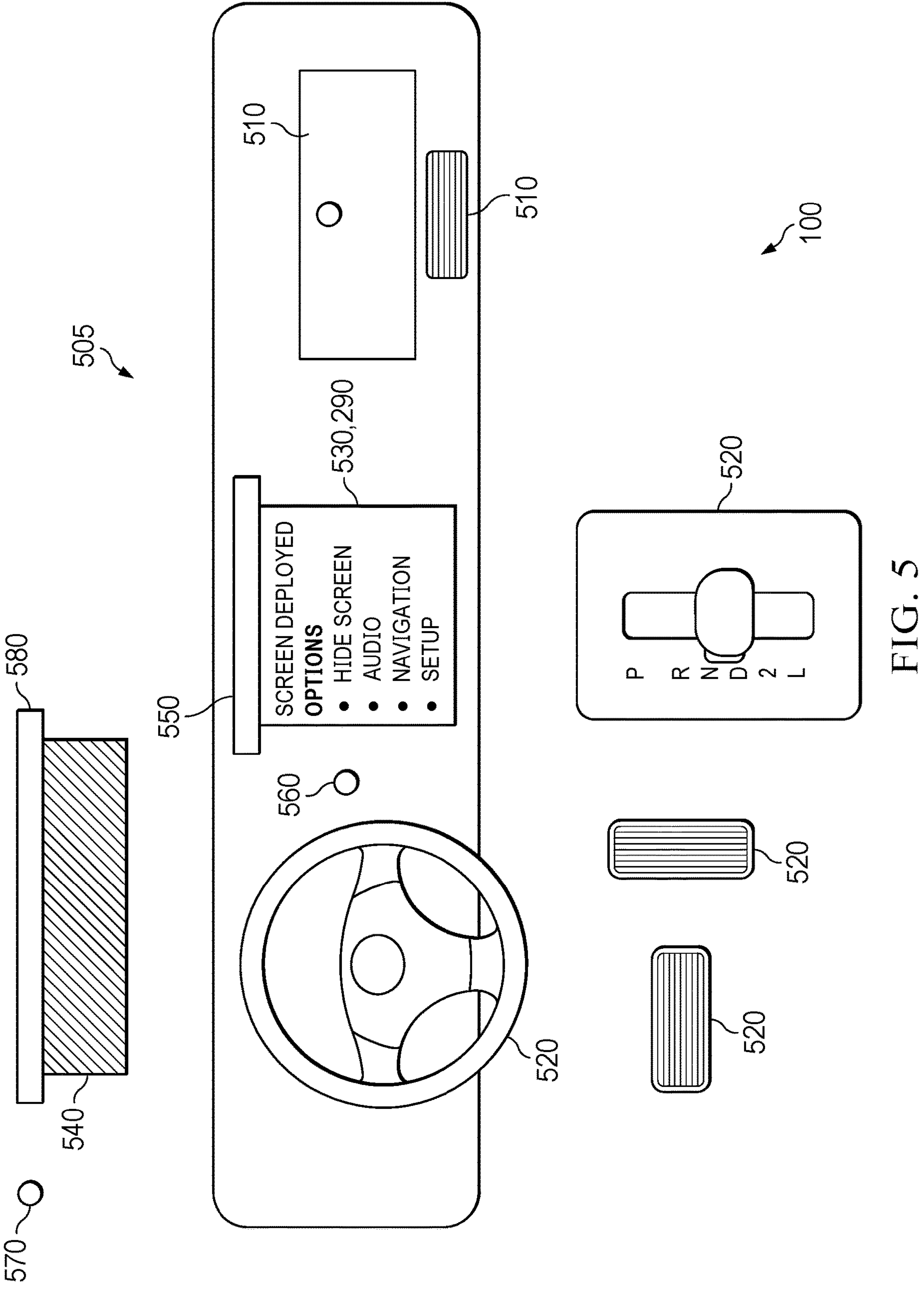
FIG. 5 is a diagrammatic illustration of an example vehicle cabin that includes a screen deployment system in accordance with at least one embodiment of the present disclosure.

FIG. 5 is a diagrammatic illustration of an example vehicle cabin 505 that includes a screen deployment system 100 in accordance with at least one embodiment of the present disclosure. Visible are vehicle interior design features 510 and driving controls 520, a deployable video display screen 530 (which may for example be a head unit 290), and a deployable sun screen or sun visor 540. In the example shown in FIG. 5, the deployable video display 530 is shown in its flat or unrolled configuration, but can retract into a housing 550 in its rolled configuration. In an example, when a user control 560 (e.g., a button) is activated, the video unrolled video display screen 530 rolls up into its housing 550, and when the same or a different user control 560 is activated, the rolled-up video display screen unrolls out of the housing into its open, flat, unrolled configuration, as shown in FIG. 5.

Similarly, the sun screen or sun visor 540 is shown in its open, flat, unrolled configuration, but when a user control 570 is activated, the sun screen or sun visor 540 rolls up into its own housing 580, and unrolls into its flat configuration, as shown in FIG. 6, if the user control 570 is activated again. Screens of the screen deployment system 100 may be activated switches, toggles, button pushes, menu selections, etc., or may be activated automatically by ambient light striking photoactive material as described above, or may be activated automatically by a control unit based on data received from one or more sensors.

Figure 6A:
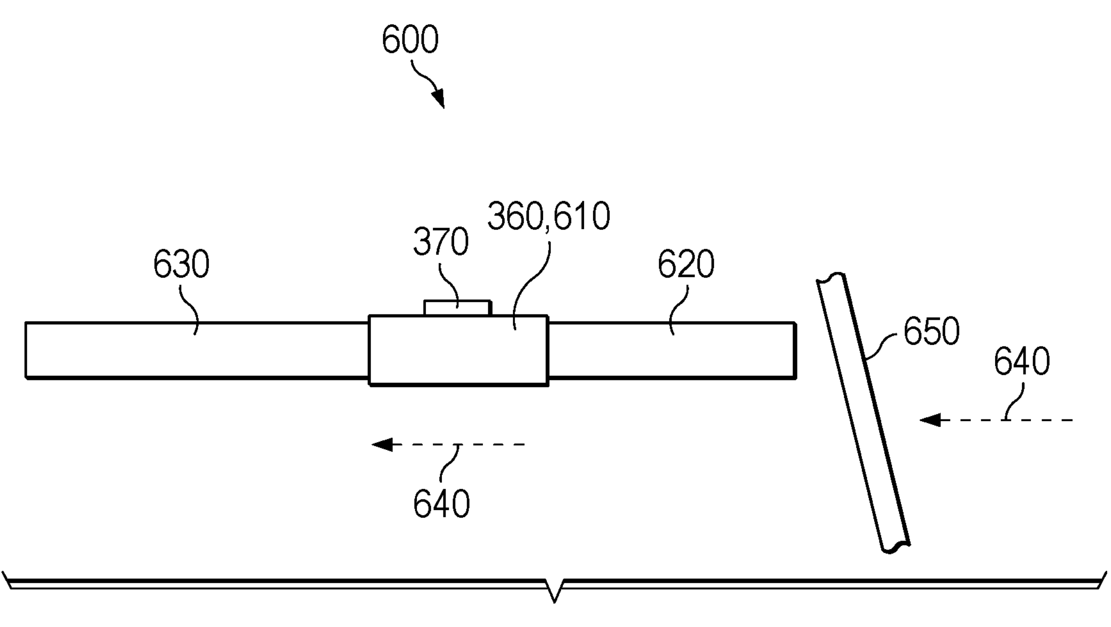
FIG. 6A is a schematic, diagrammatic side view of a deployable sun visor of the screen deployment system, in accordance with at least one embodiment of the present disclosure.

FIG. 6A is a schematic, diagrammatic side view of a deployable sun visor 600 of the screen deployment system 100, in accordance with at least one embodiment of the present disclosure. A photoactive hinge 610 attaches a sun visor 620 to a structural element 630. In the example shown in FIG. 6A, the photoactive hinge 610 is in a straight configuration that holds the sun visor 620 horizontal, such that rays of light 640 (e.g., sunlight) passing through the vehicle's windshield 650 are not blocked by the sun visor 620. The deployable sun visor 600 also includes an LED 370. The LED may for example be a near-infrared LED, an ultraviolet LED, a white LED, a colored (e.g., red, yellow, green, blue, etc.) LED, or a multicolored LED, whose output wavelength(s) and brightness are sufficient to expand the photoactive material 360 of the photoactive hinge 610. In some instances, an infrared LED may be preferred, as its light is not visible to human occupants of the vehicle. Although FIG. 6A is described in reference to a single LED, multiple LEDs may be used. In some embodiments, other light sources may be used instead or in addition, including but not limited to organic LEDs, micro LEDs, incandescent light bulbs, electroluminescent panels, cathode ray tubes, and otherwise.

In the example shown in FIG. 6A, the LED 370 is off, and the photoactive hinge 610 is in a flat resting state. When the LED 370 is switched on, the photoactive material 360 expands in such a way that the photoactive hinge 610 bends downward.

Figure 6B:
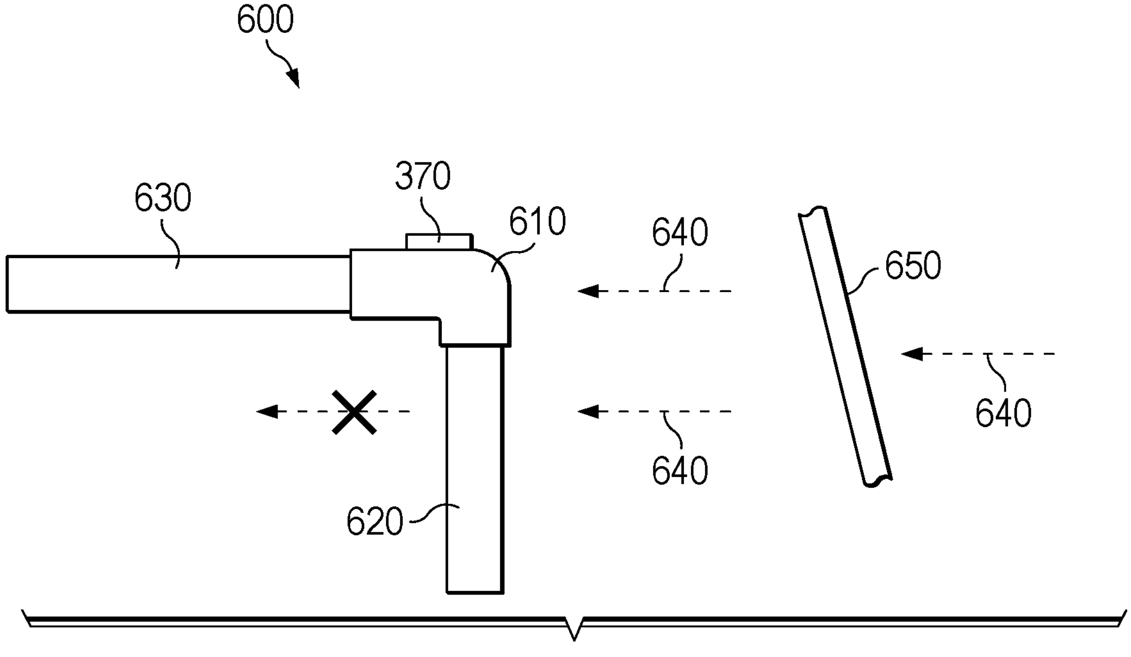
FIG. 6B is a schematic, diagrammatic side view of a deployable sun visor of the screen deployment system, in accordance with at least one embodiment of the present disclosure.

FIG. 6B is a schematic, diagrammatic side view of a deployable sun visor 600 of the screen deployment system 100, in accordance with at least one embodiment of the present disclosure. Visible are the LED 370, photoactive hinge 610, sun visor 620, structural element 630, rays of light 640 (e.g., sunlight) passing through the windshield 650 are not blocked by the sun visor 620. In the example shown in FIG. 6B, the photoactive hinge 610 is in a bent state, activated by turning on the LED 370. The bent state of the photoactive hinge 610 has placed the sun visor 620 in a vertical orientation where it is capable of blocking at least some incoming rays of light 640 (e.g., sunlight).

In some embodiments, the photoactive hinge 610 remains in the bent state while the LED 370 is on, and reverts to the flat state of FIG. 6A when the LED 370 is turned off. However, in other embodiments, the photoactive hinge 610 is positioned and oriented such that when the photoactive hinge 610 is in the bent state, rays of light 640 coming in through the windshield 650 can impinge on the photoactive hinge 610 to keep it in the bent state, and thus to keep the sun visor 620 in the vertical (blocking) orientation. In such embodiments, the photoactive hinge 610 may, for example, return to the horizontal orientation when the levels of light 640 coming through the windshield 650 have dropped below a threshold value, or may gradually transition from the bent state to the straight state as the amount of light 640 decreases.

Figure 7A:
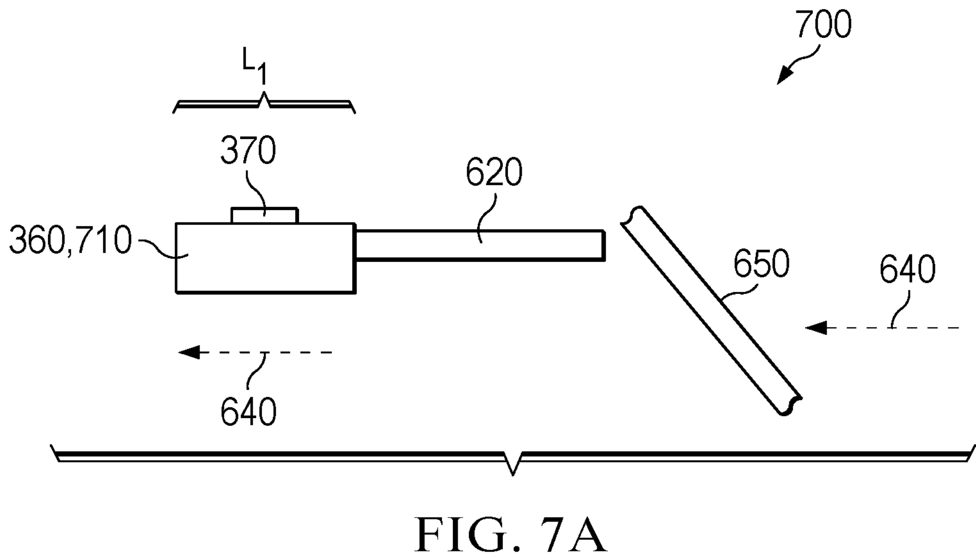
FIG. 7A is a schematic, diagrammatic side view of a deployable sun visor of the screen deployment system, in accordance with at least one embodiment of the present disclosure.

FIG. 7A is a schematic, diagrammatic side view of a deployable sun visor 700 of the screen deployment system 100, in accordance with at least one embodiment of the present disclosure. A photoactive piston 710 attaches to a sun visor 620. In the example shown in FIG. 7A, the photoactive piston 710 is in a contracted state that holds the sun visor 620 horizontal, such that rays of light 640 (e.g., sunlight) passing through the vehicle's windshield 650 are not blocked by the sun visor 620. The deployable sun visor 700 also includes an LED 370. In the example shown in FIG. 7A, the LED 370 is off, and the photoactive piston 710 is in a contracted resting state and has a length $L_1$. When the LED 370 is switched on, the photoactive material 360 expands in such a way that the photoactive piston 710 extends in a forward direction, toward the windshield.

Figure 7B:
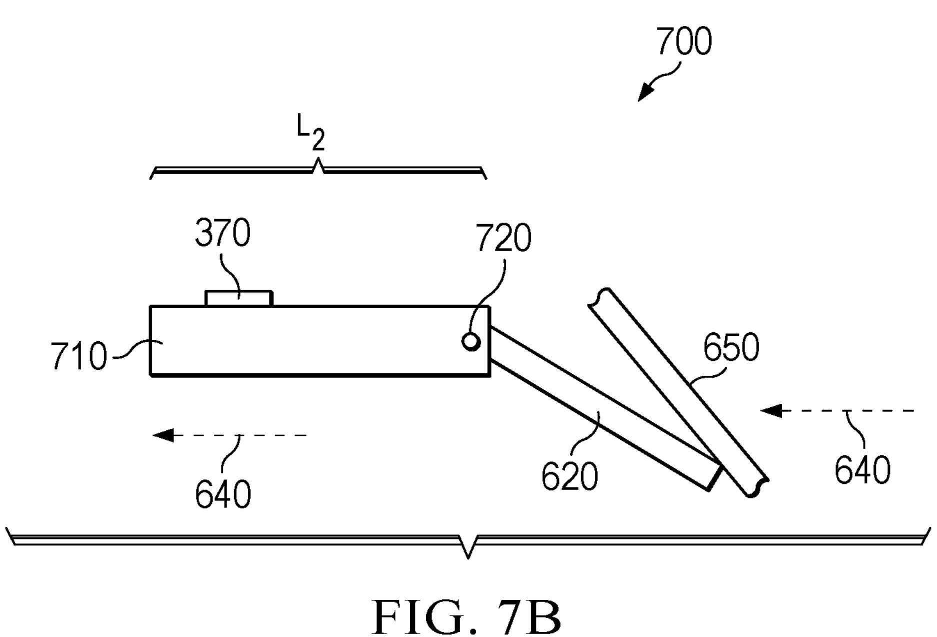
FIG. 7B is a schematic, diagrammatic side view of a deployable sun visor of the screen deployment system, in accordance with at least one embodiment of the present disclosure.

FIG. 7B is a schematic, diagrammatic side view of a deployable sun visor 700 of the screen deployment system 100, in accordance with at least one embodiment of the present disclosure. Visible are the photoactive piston 710, sun visor 620, rays of light 640, windshield 650, and LED 370. In the example shown in FIG. 7B, the LED 370 is off, and the photoactive hinge 610 is in a lengthened or extended state and has a length $L_2$ that is greater than the length $L_1$ of FIG. 7A. This lengthening has pushed the sun visor 620 against the windshield 650, causing the sun visor 620 to angle downward such that it is capable of blocking at least some of the incoming sunlight 640. This angling may for example be facilitated by a spring-loaded hinge 720, or by having portions of the photoactive piston 710 and/or sun visor 620 be flexible. In some embodiments, the photoactive piston 710 will return to its contracted state when the LED 370 is turned off. In other embodiments, the extended photoactive piston 710 receives enough sunlight 640 to remain in the extended state, until the levels of incoming sunlight drop below a threshold value.

Figure 8:
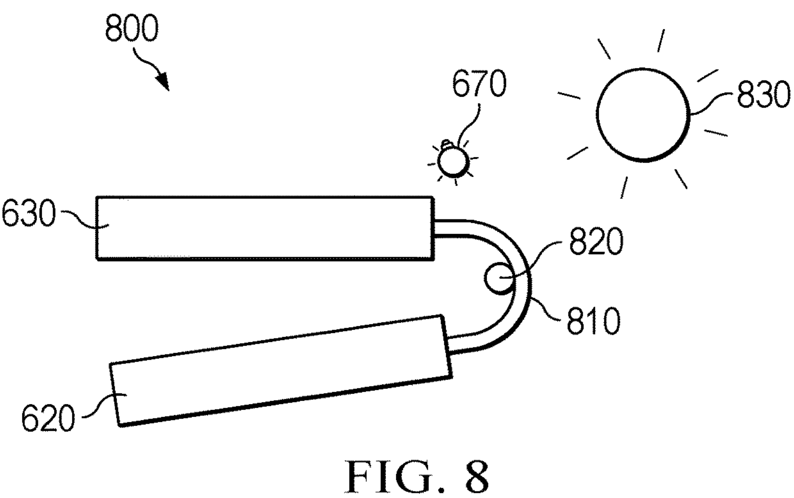
FIG. 8 is a schematic, diagrammatic side view of a deployable sun visor of the screen deployment system, in accordance with at least one embodiment of the present disclosure.

FIG. 8 is a schematic, diagrammatic side view of a deployable sun visor 800 of the screen deployment system 100, in accordance with at least one embodiment of the present disclosure. In the example of FIG. 8, the sun visor 620 is connected to the structural member (e.g., the roof of the vehicle) by a photoactive strap 810. The photoactive strap 810 wraps around a rod, pin, or pulley 820, such that when the photoactive strap is illuminated by an LED 670 or the sun 830, the sun visor 620 is pulled into a vertical configuration where it is capable of blocking at least some sunlight from entering the vehicle through the windshield.

In some embodiments, in the relaxed state, the photoactive strap 810 is short, and holds the sun visor 620 in a horizontal (non-blocking) orientation, and in the illuminated state, the photoactive strap 810 lengthens, allowing the sun visor 620 to be in a vertical (blocking) orientation. In other embodiments, in the relaxed state, the photoactive strap 810 is long, and the sun visor 620 is in a horizontal (non-blocking) orientation, and in the illuminated state, the photoactive strap shortens, pulling the sun visor 620 into a vertical (blocking) orientation. Numerous alternative arrangements of the components shown in FIG. 8, as would occur to a person of ordinary skill in the art, can be used to achieve the same effect of switching the sun visor 620 from a horizontal (non-blocking) orientation to a more vertical (blocking) orientation. Such embodiments explicitly fall within the scope of the present disclosure.

Figure 9:
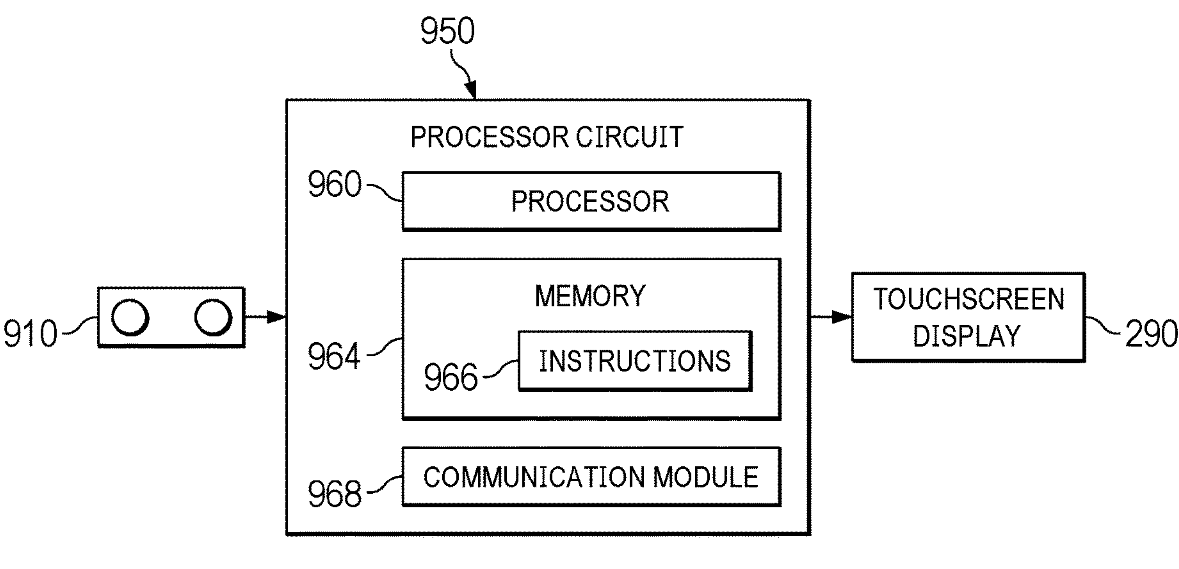
FIG. 9 is a diagrammatic illustration of a processor circuit, in accordance with at least one embodiment of the present disclosure.

FIG. 9 is a diagrammatic illustration of a processor circuit 950 in accordance with at least one embodiment of the present disclosure. The processor circuit 950 may be implemented in the screen deployment system 100, VCU 110, portable device 300, or other devices or workstations (e.g., third-party workstations, network routers, etc.), or on a cloud processor or other remote processing unit, as necessary to implement the method. As shown, the processor circuit 950 may include a processor 960, a memory 964, and a communication module 968. These elements may be in direct or indirect communication with each other, for example via one or more buses.

The processor 960 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 960 may also comprise another hardware device, a firmware device, or any combination thereof configured to perform the operations described herein. The processor 960 may also be implemented as a combination of computing devices, e.g., a combination of a DSP and a microprocessor, a plurality of microprocessors, one or more microprocessors in conjunction with a DSP core, or any other such configuration.

The memory 964 may include a cache memory (e.g., a cache memory of the processor 960), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 964 includes a non-transitory computer-readable medium. The memory 964 may store instructions 966. The instructions 966 may include instructions that, when executed by the processor 960, cause the processor 960 to perform the operations described herein. Instructions 966 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 968 can include any electronic circuitry and/or logic circuitry to facilitate direct or indirect communication of data between the processor circuit 950, and other processors or devices. In that regard, the communication module 868 can be an input/output (I/O) device. In some instances, the communication module 868 facilitates direct or indirect communication between various elements of the processor circuit 850 and/or the screen deployment system 100. The communication module 1068 may communicate within the processor circuit 950 through numerous methods or protocols. Serial communication protocols may include but are not limited to United States Serial Protocol Interface (US SPI), Inter-Integrated Circuit ($I^2C$), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or sensor readings) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

In the example shown in FIG. 9, the processor circuit 950 receives sensor data from a sensor 910, and sends output to a display 290.

As will be readily appreciated by those having ordinary skill in the art after becoming familiar with the teachings herein, the screen deployment system advantageously provides a means to actuate (e.g., extend or retract) a screen, without requiring human power or a motor actuator. The screen deployment system may require substantially less energy than a motor actuator, while providing less risk of mechanical breakdown, in a system that otherwise provides similar performance. Depending on the implementation, a number of variations are possible on the examples and embodiments described above. For example, different photoactive or photoresponsive materials could be used than those described herein. Different light sources may be used, and the photoactuator may deploy or retract different types of screens than those described herein. The technology may be applied to different vehicle types, including cars, trucks, vans, campers, aircraft, spacecraft, boats, ships, and otherwise. The technology can also be used in non-automotive applications including buildings, workshops, operating rooms, and otherwise.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the screen deployment system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the screen deployment system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A screen deployment device, comprising:

a screen;

a plurality of light sources configured to emit near-infrared light; and a plurality of photoactuators directly physically coupled to the screen and to the plurality of light sources and configured to change size or shape in response to near-infrared light, wherein when the plurality of photoactuators is illuminated by near-infrared light from the plurality of light sources, the screen is in a first shape, position, or orientation, and wherein when the plurality of photoactuators is not illuminated by near-infrared light from the plurality of light sources, the screen is in a second shape, position, or orientation.

2. The screen deployment device of claim 1, wherein the plurality of light sources comprises a plurality of LEDs.

3. The screen deployment device of claim 1, wherein the plurality of light sources comprises a plurality of incandescent light bulbs, a plurality of electroluminescent panels, a plurality of cathode ray tubes, or a plurality of video displays.

4. The screen deployment device of claim 1, wherein each photoactuator of the plurality of photoactuators comprises a photoactive material.

5. The screen deployment device of claim 4, wherein the photoactive material comprises a spiropyran hydrogel.

6. The screen deployment device of claim 1, wherein the screen is a sun visor.

7. The screen deployment device of claim 1, wherein the screen is a video display.

8. The screen deployment device of claim 1, wherein the first shape, position, or orientation is associated with the screen not performing a function, and the second shape, position, or orientation is associated with the screen performing the function.

9. The screen deployment device of claim 8, wherein the function is displaying video or blocking sunlight.

10. A screen deployment system, comprising:

a vehicle;

a screen disposed within the vehicle;

a plurality of light sources configured to emit near-infrared light; and a plurality of photoactuators disposed within the vehicle and directly physically coupled to the screen and to the plurality of light sources and configured to change size or shape in response to near infrared light, wherein when the plurality of photoactuators is illuminated by near infrared light from the plurality of light sources, the screen is in a first shape, position, or orientation, and wherein when the plurality of photoactuators is not illuminated by near-infrared light from the plurality of light sources, the screen is in a second shape, position, or orientation.

11. The screen deployment system of claim 10, wherein the plurality of light sources comprises a plurality of LEDs.

12. The screen deployment system of claim 10, wherein the plurality of light sources comprises a plurality of incandescent light bulbs, a plurality of electroluminescent panels, a plurality of cathode ray tubes, or a plurality of video displays.

13. The screen deployment system of claim 10, wherein each photoactuator of the plurality of photoactuators comprises a photoactive material.

14. The screen deployment system of claim 10, wherein the screen is a sun visor, wherein the first shape, position, or orientation is associated with the sun visor not blocking sunlight, and wherein the second shape, position, or orientation is associated with the sun visor blocking sunlight.

15. The screen deployment system of claim 10, wherein the screen is a video display, wherein the first shape, position, or orientation is associated with the video display not displaying video, and wherein the second shape, position, or orientation is associated with the video display displaying video.

16. A method for deploying a screen, the method comprising:

coupling the screen to a plurality of photoactuators, wherein each photoactuator of the plurality of photoactuators is configured to change size or shape in response to near-infrared light; and illuminating the plurality of photoactuators with near-infrared light from a plurality of light sources directly physically coupled to the plurality of photoactuators, such that:

when the plurality of photoactuators is illuminated by the near-infrared light from the plurality of light sources, the screen is in a first shape, position, or orientation, and when the plurality of photoactuators is not illuminated by the near-infrared light from the plurality of light sources, the screen is in a second shape, position, or orientation.

17. The method of claim 16, wherein the plurality of light sources is plurality of LEDs, each photoactuator of the plurality of photoactuators comprises a photoactive material, and the screen is a sun visor or video display.

18. The method of claim 16, wherein the first shape, position, or orientation is associated with the screen not performing a function, and the second shape, position, or orientation is associated with the screen performing the function.

* * * * *